United States Patent Office 3,377,902
Patented Apr. 16, 1968

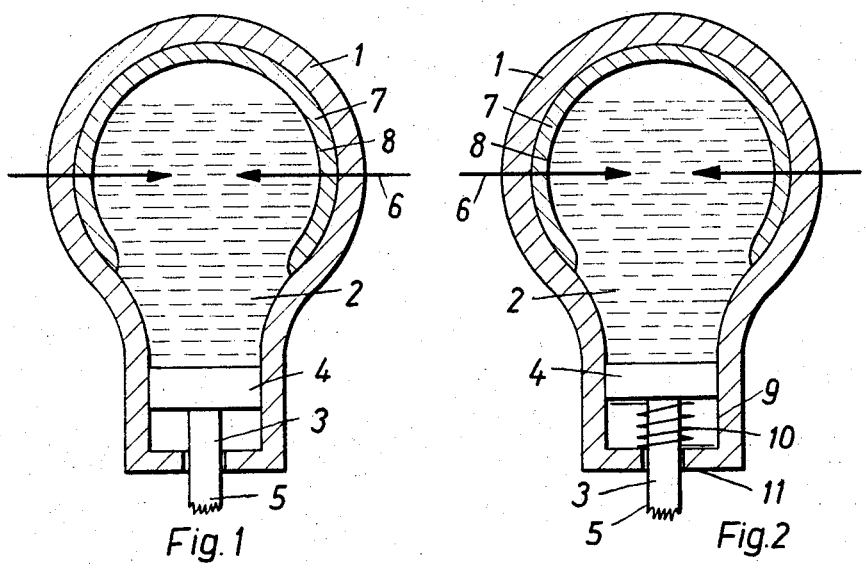
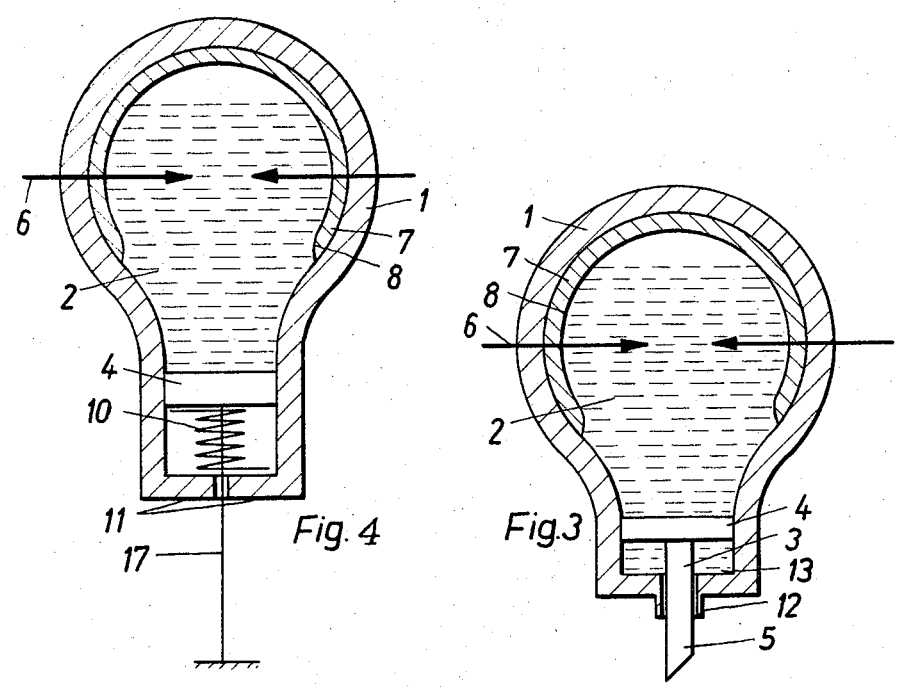

3,377,902
BORING APPARATUS AND METHOD
Hermann Bodenseher, Vienna, Austria, assignor to
Brown, Boveri & Cie, AG., Mannheim-Kafertal,
Germany, a corporation of Germany
Filed Dec. 28, 1965, Ser. No. 517,000
Claims priority, application Germany, Feb. 9, 1965,
B 80,426
5 Claims. (Cl. 83—639)

ABSTRACT OF THE DISCLOSURE

An apparatus for boring into brittle and very hard materials by means of shock current pulses in a liquid. Pressure waves produced by shock current discharges in a liquid are transmitted to a cutting tool whose inherent mechanical frequency in the boring direction corresponds to the pulse repetition frequency of the shock current discharges. The base of the cutting tool, such as a chisel, in one of the embodiments serves as a piston and thus as one of the walls of the container, the container being filled with liquid. A spark gap apparatus is provided for producing shock current discharges in the liquid. The spark gap apparatus is adapted to be connected to a current pulse source. The boring and cutting tool which extends into the container confines the liquid therein. When the spark gap apparatus is discharged with current pulses from the source, pressure waves are produced and directed by the liquid against the tool, causing it to vibrate. The pulse repetition frequency of the current pulses is chosen to be equal to the inherent resonant mechanical frequency of the cutting tool, in its operating direction, and accordingly the tool is caused to vibrate at the frequency of the imposed pulses.

My invention relates to an apparatus for boring. More particularly, it relates to such improved apparatus capable of boring into and cutting brittle and very hard materials.

Known and conventional methods for boring or otherwise handling and treating brittle and very hard materials are applied with great difficulty and entail considerable expense. High-frequency ultrasonic borers have been utilized for such purpose, such borers operating with a chisel or cutting tool whose vibrating frequency is determined by an acoustic wave. Such ultrasonic borers are extremely costly since the production of ultrasonic apparatus with sufficient energy for hard or brittle material boring entails the use of the complicated and very expensive apparatus.

Accordingly, it is an important object of this invention to provide an apparatus for boring and cutting hard and brittle materials which is simple and inexpensive as compared to known methods and apparatus employed for the same purpose.

This object is achieved by effecting boring and cutting by means of shock current pulses in a liquid. In accordance with the invention, the pressure waves produced by shock current discharges in a liquid are transmitted to a cutting tool such as a chisel whose inherent mechanical frequency in the boring direction, i.e., the operating direction, corresponds to the pulse repetition frequency of the shock current discharges.

According to an embodiment of the invention, a spark gap is provided in a closed container which is filled with liquid, the base of the chisel or cutting tool forming one of the walls of the container. The chisel may be tightly affixed to the container or it may be designed as a piston and may be disposed within a cylinder inserted into the container, slidable in the cutting, i.e., operating direction and sealing off the liquid. In such arrangement, the base of the chisel is suitably urged against the liquid by a spring, the urging being against the side of the base not facing the spark gap. Consequently, the vibratory construction upon which the pressure waves are produced by the shock current pulses are imposed, is constituted by the chisel and the spring.

According to another embodiment of the invention, the base of the chisel is constructed to be much stronger than the shank of the chisel. With such chisel construction, the cylinder within which the chisel is disposed is additionally sealed off from the spark gap at the side of the base of the chisel not facing the spark gap and the space defined thereby is also filled with a liquid in the place of the hereinabove mentioned spring.

In a sliding piston arrangement, the spring or the auxiliary space filled with a liquid may be dispensed with if the base of the piston-type chisel makes so tight a closure that liquid cannot escape from the container. In such arrangement, the chisel is returned to its original position from a cutting stroke by the pressure decrease produced after each shock current pulse discharge.

According to another embodiment, the effect of the pressure waves produced by the shock current pulses is augmented if the container wall which extends into the cylinder is made in the shape of a funnel.

In order to reduce the effect of the pressure wave upon the walls of the container, the inner surfaces of these walls, with the exception of the base of the chisel may be coated with an elastic layer which is impervious to the liquid. This layer advantageously comprises a porous material containing gas inclusions, and which is sealed off from the liquid by foil. The latter foil, preferably is coated with metal on the side facing the spark gap.

According to a variation of the invention, it is also advantageous to provide a coil for discharging the shock current. In the case of this variation, the base of the chisel is designed to be electrically conductive. The transmission of energy occurs thereby by the action of the force between the primary shock current and the eddy currents induced by the primary shock current in the base of the chisel. In this arrangement, the discharges also occur periodically with a pulse repetition frequency which is equal to the inherent mechanical frequency of the chisel in the operating, i.e., cutting direction.

According to a further development of the invention, the shank of the chisel may be constructed to be very thin, i.e., similar to a wire, for example, and is tightly clamped. With such design, the device according to the invention may be employed for sawing.

If the device is operated at the resonant frequency, there exists the danger that it may be destroyed if it is being switched on while the chisel or cutter, i.e., the employed tool, does not touch the workpiece to be operated upon since the vibration is not damped. Consequently, according to the invention, switching means are provided to disconnect the device in such instances and to initiate the pulse sequence of the discharge only when the employed tool makes contact with the workpiece.

In order to avoid too great an amplitude change in the borer because of a dissonance in the inherent frequency of the workpiece caused by the damping workpiece, it is advantageous to damp the vibrating structure, i.e., borers, springs, etc., in advance. Suh damping can be effected, for example, by a bulge on the borer which is surrounded by a sufficiently viscous medium, a suitable example of the latter being, for example, oil or water.

Generally speaking and in accordance with the invention, there is provided a method comprising disposing a boring and cutting tool to confine a first liquid in a container, the liquid containing a spark gap apparatus therein, and discharging the spark gap at a pulse repetition frequency equal to the inherent mechanical frequency of said tool in its operating direction to produce pressure waves against the tool to cause it to vibrate.

Also, in accordance with the invention, there is provided a boring and cutting apparatus comprising a container, a liquid being container in the container. In this liquid, there is disposed a spark gap means adapted to be connected to a current pulse source. A boring and cutting tool extends into the container to confine the liquid therein. The discharging of the spark gap means with current pulses supplied thereto from the current pulse source causes pressure valves to be produced against the tool to cause it to vibrate, the pulse repetition frequency of the current pulses being chosen to equal the inherent mechanical frequency of the cutting tool in its operating direction.

The abovementioned and more specific objects and features of my invention will be apparent from and will be mentioned in the following description of a boring apparatus and method according to the invention shown by way of example in the accompanying drawing.

In the drawing,

FIG. 1 is a depiction, partly in section, of an illustrative embodiment of a boring and cutting apparatus constructed according to the invention;

FIG. 2 is a depiction similar to FIG. 1 and shows a variation in the apparatus shown in FIG. 1;

FIG. 3 is a depiction similar to FIGS. 1 and 2 and shows another embodiment according to the invention; and FIG. 4 is a depiction similar to that of FIGS. 1–3 and shows yet another embodiment according to the invention.

Referring now to FIG. 1, a container 1 is filled with a liquid 2. Container 1 is sealed at one end by a chisel 3 which comprises a base 4 and a shaft or shank 5. Base 4 makes tight contact with the wall of the container 1. A pair of spark gap electrodes 6 extend through the wall of container 1 into liquid 2, electrodes 6 being adapted to be connected to an electrical power source for providing strong current pulses, the opposing ends of electrodes 6 being spaced from each other in liquid 2 to define a spark gap therebetween.

In the operation of the arrangement of FIG. 1, the pressure waves produced by spark discharges in the spark gap, set the chisel into longitudinal vibrations at a pulse frequency which corresponds to its inherent frequency in the longitudinal direction, i.e., at a resonant frequency. In order to minimize the effect of pressure waves against the wall of the container, the wall is coated on its inner surface with an elastic layer 7. Layer 7 is suitably covered with a metal coated foil 8.

The device shown in FIG. 2 is essentially similar to that shown in FIG. 1 and, accordingly, the same numerals have been employed to designate respective corresponding structures. In this device, container 1 is constructed as a cylinder at the location of base 4 of the chisel, base 4 being disposed in this location and being slidable in a piston-like arrangement to seal off liquid 2. A spring 10 is provided which exerts pressure against the side of base 4 distal to the spark gap, spring 10 being supported by a holder 11 which is tightly affixed to container 1. In the device shown in FIG. 2, the oscillatory mechanical system is constituted by spring 10 and chisel 3. The pulse repetition frequency of the respective discharges across the spark gap is tuned in this arrangement, to the inherent frequency thereof.

Another variation in accordance with the invention is illustrated in the device shown in FIG. 3. In the latter device, cylinder 9 is sealed off at its open end against the shank 5 of the chisel at the location 12 whereat shank 5 extends through the cylinder to the exterior. The space defined thereby from the side of base 4 which is distal to the spark gap is filled with a liquid 13. In the device shown in FIG. 3, the oscillatory system is formed by the chisel and liquid 13. The inherent frequency of the mechanical oscillatory system to which the spark gap discharge pulse repetition frequency is tuned, is a function of the compression modulus of liquid 13 and the mass of the chisel.

In the illustrative embodiment according to the invention shown in FIG. 4, the shank of the chisel is constructed in the form of a wire 17 which is attached at its free end and is clamped between the base 4 of the chisel and its fixed end. In the operation of the embodiment shown in FIG. 4, the pressure waves which are produced by the pulse discharges across the spark gap set wire 17 into vibration. A workpiece in contact with the wire is consequently cut or split by the latter at the contact location.

It will be obvious to those skilled in the art, upon studying this disclosure, that boring apparatus and methods according to my invention permit of a great variety of modifications and hence can be given embodiments other than those particularly illustrated and described herein without departing from the essential features of my invention and within the scope of the claims annexed hereto.

I claim:

1. A boring and cutting apparatus comprising a container, a first liquid contained in said container, spark gap means adapted to be connected to a current pulse source disposed within said liquid, and a boring and cutting tool extending into said container to confine said first liquid therein, the discharging of said spark gap means with current pulses supplied thereto from said source causing pressure waves to be produced against said tool to cause it to vibrate, the pulse repetition frequency of said current pulses being chosen to equal the inherent resonant mechanical frequency of said cutting tool in its operating direction, said tool comprising a base piston-like portion which is tightly slidably received within said container to confine said liquid, and a shank portion which extends from the side of said base distal to said spark gap means and further including tensioning means to urge said base against said liquid.

2. A boring and cutting apparatus as defined in claim 1, and further including a second liquid filling the space defined by said container and said distal side.

3. A boring and cutting apparatus as defined in claim 1, wherein a layer of porous elastic material containing gas inclusions and which is impervious to said first liquid is provided on the inner surface of the portions of said container containing said first liquid.

4. A boring and cutting apparatus as defined in claim 3 wherein a metal foil is provided on said elastic layer to seal off said elastic layer from said first layer.

5. A boring and cutting apparatus as defined in claim 1 wherein said shank portion is of wire form.

References Cited

UNITED STATES PATENTS

| 2,433,007 | 12/1947 | Weyandt | 173—134 |
| 2,452,211 | 10/1948 | Rosenthal | 83—575 |
| 3,181,799 | 5/1965 | Wurzburg et al. | 241—1 |

JAMES M. MEISTER, *Primary Examiner.*